(12) United States Patent
Ahn

(10) Patent No.: US 7,580,864 B2
(45) Date of Patent: Aug. 25, 2009

(54) METHOD FOR CIRCULATING AN ELECTRONIC GIFT CERTIFICATE IN ONLINE AND OFFLINE SYSTEM

(75) Inventor: Hee-Jung Ahn, Seoul (KR)

(73) Assignee: KTFreetel Co., Ltd., Seoul (KR)

( * ) Notice: Subject to any disclaimer, the term of this patent is extended or adjusted under 35 U.S.C. 154(b) by 455 days.

(21) Appl. No.: 10/528,528

(22) PCT Filed: Sep. 18, 2003

(86) PCT No.: PCT/KR03/01911

§ 371 (c)(1),
(2), (4) Date: Mar. 18, 2005

(87) PCT Pub. No.: WO2004/027670

PCT Pub. Date: Apr. 1, 2004

(65) Prior Publication Data

US 2005/0273392 A1    Dec. 8, 2005

(30) Foreign Application Priority Data

Sep. 18, 2002    (KR) ............... 10-2002-0056769

(51) Int. Cl.
*G06Q 30/00* (2006.01)
(52) U.S. Cl. .................................... 705/26
(58) Field of Classification Search ........... 705/26, 705/14
See application file for complete search history.

(56) References Cited

U.S. PATENT DOCUMENTS

| | | | | |
|---|---|---|---|---|
| 5,710,886 A | * | 1/1998 | Christensen et al. | 705/14 |
| 5,870,718 A | * | 2/1999 | Spector | 705/26 |
| 6,370,514 B1 | * | 4/2002 | Messner | 705/14 |
| 6,594,644 B1 | * | 7/2003 | Van Dusen | 705/39 |
| 7,006,993 B1 | * | 2/2006 | Cheong et al. | 705/38 |
| 7,010,512 B1 | * | 3/2006 | Gillin et al. | 705/39 |
| 7,209,889 B1 | * | 4/2007 | Whitfield | 705/14 |

(Continued)

FOREIGN PATENT DOCUMENTS

JP    2000-123095    4/2000

(Continued)

OTHER PUBLICATIONS

Chartrand, S., "Patents; The Success of Automated Teller Machines Leads to Other Inventions to Replace Human Processors," New York Times, late edition, Final Ed., p. 2, col. 1, Feb. 15, 1999.*

(Continued)

*Primary Examiner*—Nicholas D Rosen
(74) *Attorney, Agent, or Firm*—Alston & Bird LLP

(57) ABSTRACT

Disclosed is an electronic gift certificate circulating method for a gift certificate service system including a gift certificate database and a gift certificate service server to manage sales of the electronic gift certificates according to requests by a communication terminal through wired and wireless networks, comprising: receiving a user's purchase request from the communication terminal; checking a settlement state of the electronic gift certificate bought by the user; settling the electronic gift certificate bought by the user, and issuing the bought electronic gift certificate to the user, when the user requests settlement; storing the issued gift certificate information in the gift certificate database; and notifying the user of the gift certificate purchase particulars in a message format.

27 Claims, 10 Drawing Sheets

U.S. PATENT DOCUMENTS

| | | | |
|---|---|---|---|
| 7,328,189 B2 * | 2/2008 | Ling | 705/41 |
| 7,398,252 B2 * | 7/2008 | Neofytides et al. | 705/64 |
| 2001/0039589 A1 * | 11/2001 | Aho et al. | 709/230 |
| 2002/0032605 A1 * | 3/2002 | Lee | 705/14 |
| 2002/0059112 A1 * | 5/2002 | Hamatani | 705/26 |
| 2002/0087469 A1 * | 7/2002 | Ganesan et al. | 705/40 |
| 2002/0091569 A1 * | 7/2002 | Kitaura et al. | 705/14 |
| 2002/0095387 A1 * | 7/2002 | Sosa et al. | 705/65 |
| 2002/0111879 A1 * | 8/2002 | Melero et al. | 705/26 |
| 2002/0152176 A1 * | 10/2002 | Neofytides et al. | 705/64 |
| 2003/0004812 A1 * | 1/2003 | Kasasaku | 705/21 |
| 2003/0004997 A1 * | 1/2003 | Parker et al. | 707/513 |
| 2003/0018553 A1 * | 1/2003 | Lindquist | 705/35 |
| 2006/0213985 A1 * | 9/2006 | Walker et al. | 235/381 |

FOREIGN PATENT DOCUMENTS

| | | | |
|---|---|---|---|
| JP | 2001306912 A | * | 11/2001 |
| JP | 2002-024531 | | 1/2002 |
| JP | 2002-163581 | | 6/2002 |
| JP | 2002-222377 | | 8/2002 |
| KR | 2000-63726 | | 11/2000 |
| KR | 2001076058 A | * | 8/2001 |
| KR | 2001-107260 | | 12/2001 |
| KR | 2002-8915 | | 2/2002 |
| KR | 2002-50322 | | 6/2002 |

OTHER PUBLICATIONS

Tedeschi, B., "E-Commerce; For the Employer, the Procrastinator and, of Course, the Merchant; Online Holiday Gift Certificates," New York Times, late edition, Final Ed., p. 16, col. 3, Dec. 6, 1999.*

Anon., "Ecount Introduces Incentives Program," Newsbytes News Network, Jun. 1, 2000.*

Anon., "Webcertificates Allows Dads and Newlyweds to Cash in on Any Gift They Want Online or Off," Business Wire, Jun. 6, 2000.*

Anon., "Ecount's Shop-Anywhere Webcertificates Now Available at Egreetings.com," Business Wire, Aug. 1, 2000.*

Anon., "Excite@Home's BlueMountain.com Brings Online Greetings and Gifts Together," PR Newswire, Dec. 4, 2000.*

Anon., "Electronic Gift Certificates now Available to Retailers, Restaurants and Other Merchants," Business Wire, p. 0081, Apr. 3, 2001.*

Benston, L., "Retailers Report Problems Verifying Gift Certificate Caards," Knight-Ridder Tribune Business News, Jan. 9, 2000.*

Sliwa, C., "Retailers Mull Pulling Plug on E-Commerce," Computerworld, vol. 36, No. 8, pp. 14, Feb. 18, 2002.*

* cited by examiner

METHOD FOR CIRCULATING AN ELECTRONIC GIFT CERTIFICATE IN ONLINE AND OFFLINE SYSTEM

BACKGROUND OF THE INVENTION (a) Field of the Invention

The present invention relates to a method for circulating electronic gift certificates in an online and offline system. More specifically, the present invention relates to a method for circulating electronic gift certificates in an online and offline system for unifying an electronic gift certificate management system and a mobile communication system into a single system to simplify an electronic gift certificate circulation system and allow the electronic gift certificates to be quickly and accurately purchased, gifted, and used.

(b) Description of the Related Art

Current gift certificates are classified as those issued by specific department stores, those issued by manufacturers that produce specific products such as shoes or clothes, and those such as book gift certificates and culture gift certificates issued and circulated by specific agencies that contract with chain stores that desire to sell the gift certificates. The culture gift certificates relate to plays and movies. In addition, various other types of gift certificates are currently in use or planned.

Also, a similar concept to the gift certificates includes boarding passes such as airplane tickets and train tickets, various sports tickets, and discount tickets for allowing a predetermined cost discount when a consumer shows a ticket. Hereinafter, the gift certificate represents a bill that has an exchangeable value so that a user may give it to a shop to make a purchase or get a discount on a desired product.

Prices of conventional product gift certificates are printed on the paper to be sold or circulated, which generally includes an issuance process and a circulation/withdrawal process. Regarding the issuance process, an issuance agency designs the gift certificates with its own desired format, and publishes them, during which various means needed for preventing forgery are included therein. Next, the printed gift certificates are delivered to many sale agencies, buyers directly visit the agencies at a predetermined time to buy the gift certificates, and the buyers uses the gift certificates at a shop so that the gift certificate is withdrawn and discarded. Together with this process, a system wherein a buyer remotely buys a gift certificate through the Internet and receives it by a home delivery service because of great developments of communication environments including the Internet, has also been proposed.

However, the above-described gift certificate circulation system for the products inconveniently causes temporal and spatial restrictions that require a buyer to visit the appointed sale agency at the appointed time so as to buy the gift certificate together with the cost needed for preventing forgery.

Electronic gift certificates have been developed so as to solve the problems of the conventional gift certificates, and here, a client withdraws desired money from his bank account or credit card through the Internet, a telephone, a cell phone, an ATM, or a credit card checker, and has an electronic gift certificate number assigned to write down on a specific form to use just like cash.

In this instance, when the client accesses a host of a managing agency and inputs his bank account number or a credit card number, the host detects this inputting process to access a VAN agency, and the VAN agency instructs a corresponding cooperating banking agency to withdraw a predetermined amount of cash and transfer the cash to the bank account of the managing agency when the client has input his bank account number, and the VAN agency approves the electronic gift certificate in the same manner as a credit card's cash loan service to transfer the money to the bank account of the managing agency, and bills the client in the same manner as the credit card's cash loan service later when the client has input his credit card number.

Hence, the client can make a purchase at the shops assigned by the managing agency using the printed electronic gift certificate, and can get the balance in cash. When receiving the electronic gift certificate, the shop accesses the host of the managing agency to confirm a usage status of the electronic gift certificate, and the managing agency withdraws the electronic gift certificate and deposits the money to the shop's bank account.

However, since the buyer has to buy and use the electronic gift certificate through the many above-noted processes in the present electronic gift certificate circulation system, a connection between the host of the managing agency and the VAN agency, and a connection among the VAN agency, the cooperated banking agency, and the credit card service provider, are accessed to a database system.

Further, since it is required to add a process of undergoing mobile communication service provision to the above-described processes when buying an electronic gift certificate, gifting it, and using it via a mobile communication method, their interconnection becomes more complicated to thus disturb fluent usage of the electronic gift certificates.

SUMMARY OF THE INVENTION

It is an advantage of the present invention to provide a method for circulating electronic gift certificates in an online and offline system for unifying an electronic gift certificate management system and a mobile communication system into a single system, to simplify an electronic gift certificate circulation system and allow the electronic gift certificates to be quickly and accurately purchased, gifted, and used.

It is an advantage of the present invention to provide a method for circulating electronic gift certificates in an online and offline system for unifying an electronic gift certificate management system and a mobile communication system into a single system, to no longer require additional settlement processes when a user uses the electronic gift certificate through a communication terminal, and to allow the user to quickly and accurately purchase, gift, and use the electronic gift certificate.

In one aspect of the present invention, an electronic gift certificate circulating method for a gift certificate service system including a gift certificate database and a gift certificate service server to manage sales of the electronic gift certificates according to requests by a communication terminal through wired and wireless networks, comprises: (a) receiving a user's purchase request from the communication terminal; (b) checking a settlement state of the electronic gift certificate bought by the user; (c) settling the electronic gift certificate bought by the user, and issuing the bought electronic gift certificate to the user, when the user requests settlement; (d) storing the issued gift certificate information in the gift certificate database; and (e) notifying the user of the gift certificate purchase particulars and gift certificate information for usage of the corresponding gift certificate in a message format.

In another aspect of the present invention, an electronic gift certificate circulating method for a gift certificate service system including a gift certificate database and a gift certificate service server to manage gifting of the electronic gift certificates according to requests by a communication terminal through wired and wireless networks, comprises: (a) receiving a user's gifting request from the communication terminal; (b) inquiring an existence state of the gift certificate possessed by the user of the gift certificate database, and determining the existence state; (c) receiving information on the gift certificate to be gifted and a transferee when the user's gift certificate is found; (d) transmitting the gift certificate selected by the user to the transferee; (e) updating the user's gift certificate information, storing the updated information in the gift certificate database together with the transferee's gift certificate information; and (f) notifying the user of the gift certificate gifting particulars and gift certificate information for usage of the corresponding gift certificate in a message format.

In still another aspect of the present invention, an electronic gift certificate circulating method for a gift certificate service system including a gift certificate database and a gift certificate service server to manage usage of the electronic gift certificates according to requests by a communication terminal through wired and wireless networks, comprises: (a) receiving the usage request of a gift certificate selected by the user from among the gift certificate information stored in the communication terminal from the communication terminal; (b) inquiring the gift certificate database of an existence state of the gift certificate possessed by the user, and determining the existence state; (c) settling the price with the gift certificate and determining whether the settlement is possible; (d) allowing the usage of the gift certificate to process the settlement on the price information when the settlement is possible; (e) settling the user's gift certificate information, updating the settlement information, and storing the updated information in the gift certificate database; and (f) notifying the user of the gift certificate usage information in the message format.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
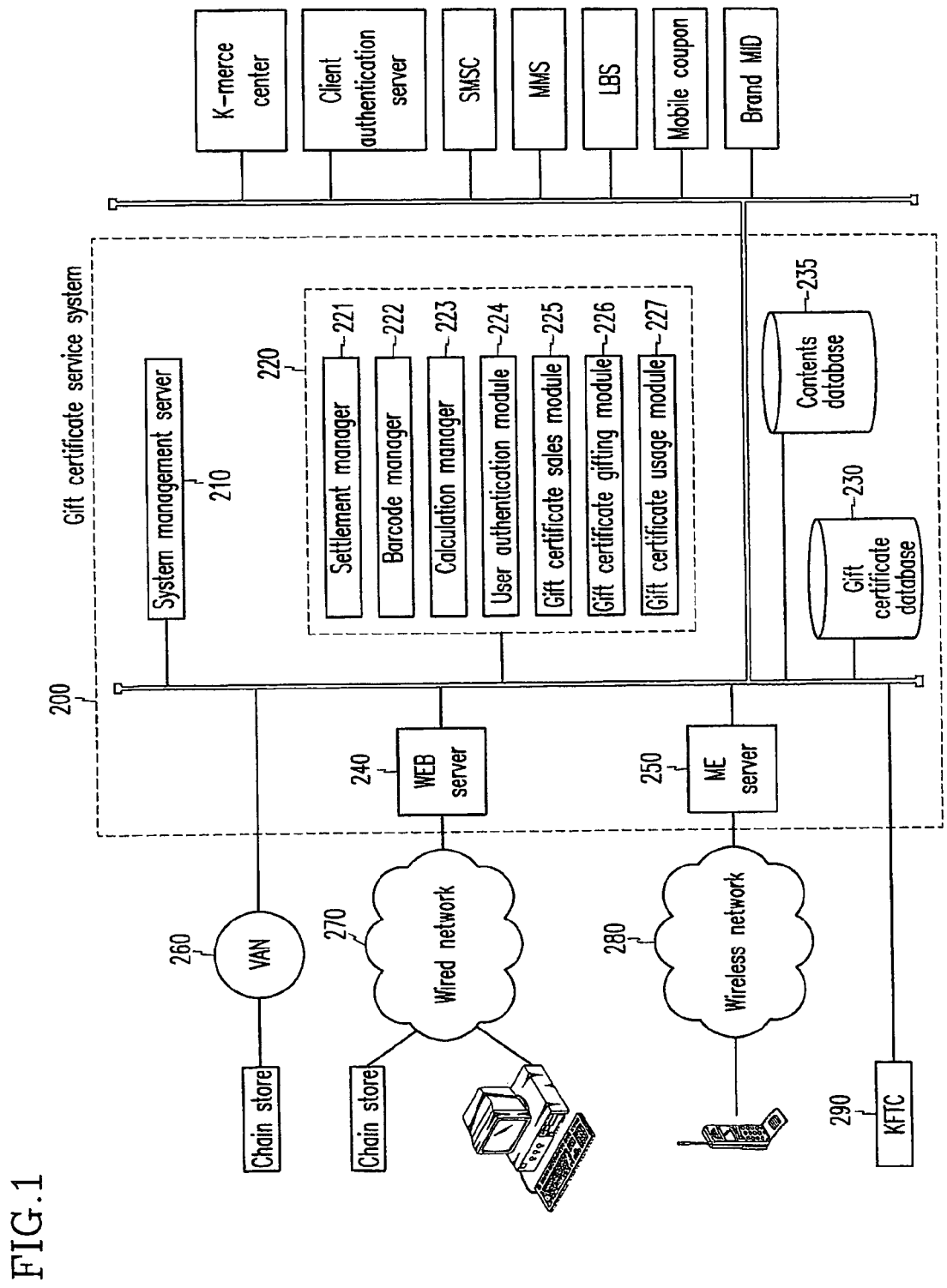
FIG. 1 shows an electronic gift certificate circulation system according to a preferred embodiment of the present invention.

FIG. 1 shows an electronic gift certificate circulation system according to a preferred embodiment of the present invention.

An electronic gift certificate service system 200 comprises a system management server 210, a gift certificate service server 220, a gift certificate database 230, a contents database 235, a WEB server 240, and an ME server 250. An electronic gift certificate circulation system includes an electronic gift certificate service system 200, a chain store that goes through a VAN 260, a chain store and a computer that go through a wired network 270, a communication terminal that goes through a wireless network 280, and the KFTC (Korean Financial Telecommunications and Clearings Institute) 290.

The gift certificate service server 220 comprises a settlement manager 221, a barcode manager 222, a settlement manager 223, a user authentication module 224, a gift certificate sales module 225, a gift certificate gifting module 226, and a gift certificate usage module 227.

The electronic gift certificate service system 200 authenticates and manages communication terminals using wired and wireless networks, and authenticates and manages the chain stores' buying the electronic gift certificates, gifting them, and using them through the wired and wireless networks or a VAN.

The system management server 210 manages whole operations of the electronic gift certificate service system 200 for managing the circulation of the electronic gift certificates.

The gift certificate service server 220 authenticates and manages requests on the electronic gift certificate circulation service from the communication terminal or the chain store under the control of the system management server 210.

The settlement manager 221 performs internal settlement processes in the gift certificate circulation system when a client buys an electronic gift certificate and requests usage of it. The barcode manager 222 manages barcodes of the electronic gift certificates. The settlement manager 223 settles altered details caused by the client's gifting and using the electronic gift certificate.

The user authentication module 224 determines, in cooperation with the gift certificate database 230, whether the client's gifting or usage of the electronic gift certificate is fair. The gift certificate sales module 225 manages sales of the electronic gift certificates to the clients, the gift certificate gifting module 226 manages gifting of the electronic gift certificates, and the gift certificate usage module 227 manages usage of the electronic gift certificates.

The gift certificate database 230 stores various data for determining whether the client's gifting or usage of the electronic gift certificate is fair according to the request by the user authentication module 224. Therefore, the gift certificate database 230 stores a gifting history and a usage history as well as a history of gift certificates bought by the client to authenticate that the client is a gift certificate member, and it is used as data for determining whether the client's gifting or usage of the electronic gift certificate is fair. The history on the gift certificates is classified by types, issuers, and prices of the gift certificates.

The contents database 235 stores items including bell sounds, background music, theme cards, and characters which can be used as gifts together with the electronic gift certificates. These additional gifts can be provided by the contents database 235 of the electronic gift certificate service system 200, and also by an external contents provider according to requests by the user.

The WEB server 240 and the ME server 250 are respectively accessed to the clients or chain stores through the wired network and the wireless network to allow information communication with the clients and the chain stores.

When a settlement is generated through a credit card, the WEB server 240 and the ME server 250 access the VAN 260 or the KFTC 290.

Also, a message service means including an MMS (multimedia message service) or an SMSC (short message service center) is accessed to the gift certificate service server 220, and transmits results on the client's purchase, gifting, and using an electronic gift certificate in a message format to a communication terminal according to an instruction of the gift certificate service server 220.

Figure 2:
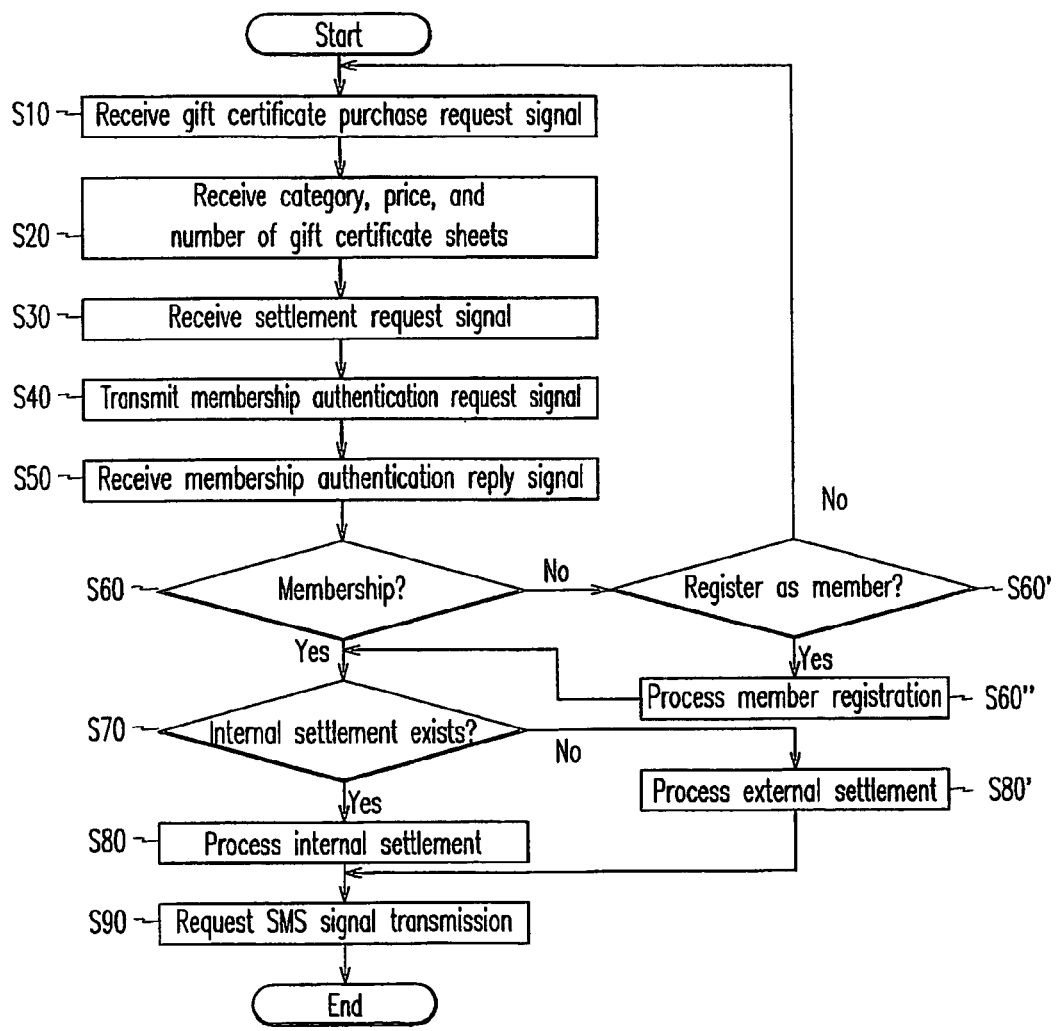
FIG. 2 shows a flowchart for selling electronic gift certificates according to a first preferred embodiment of the present invention.
Figure 3:
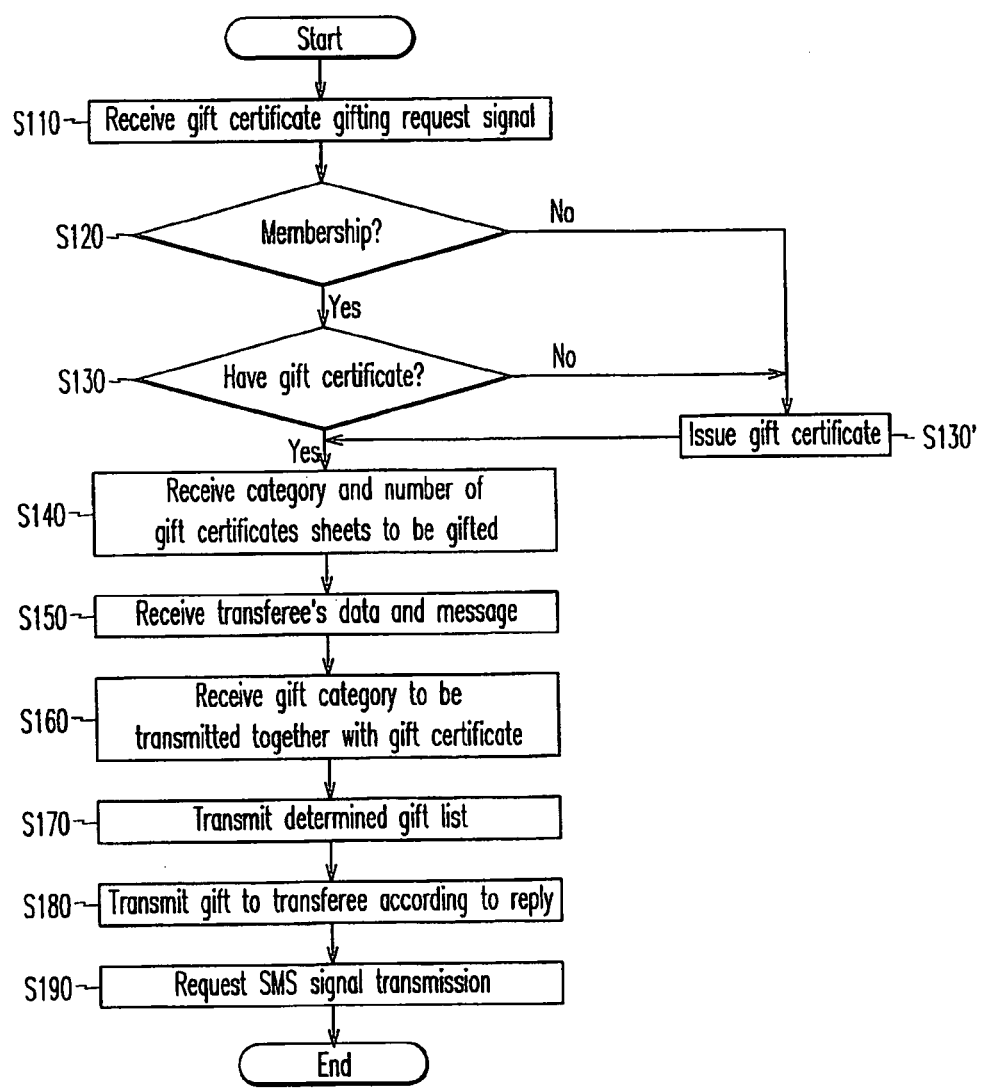
FIG. 3 shows a flowchart for gifting electronic gift certificates according to a second preferred embodiment of the present invention.
Figure 4:
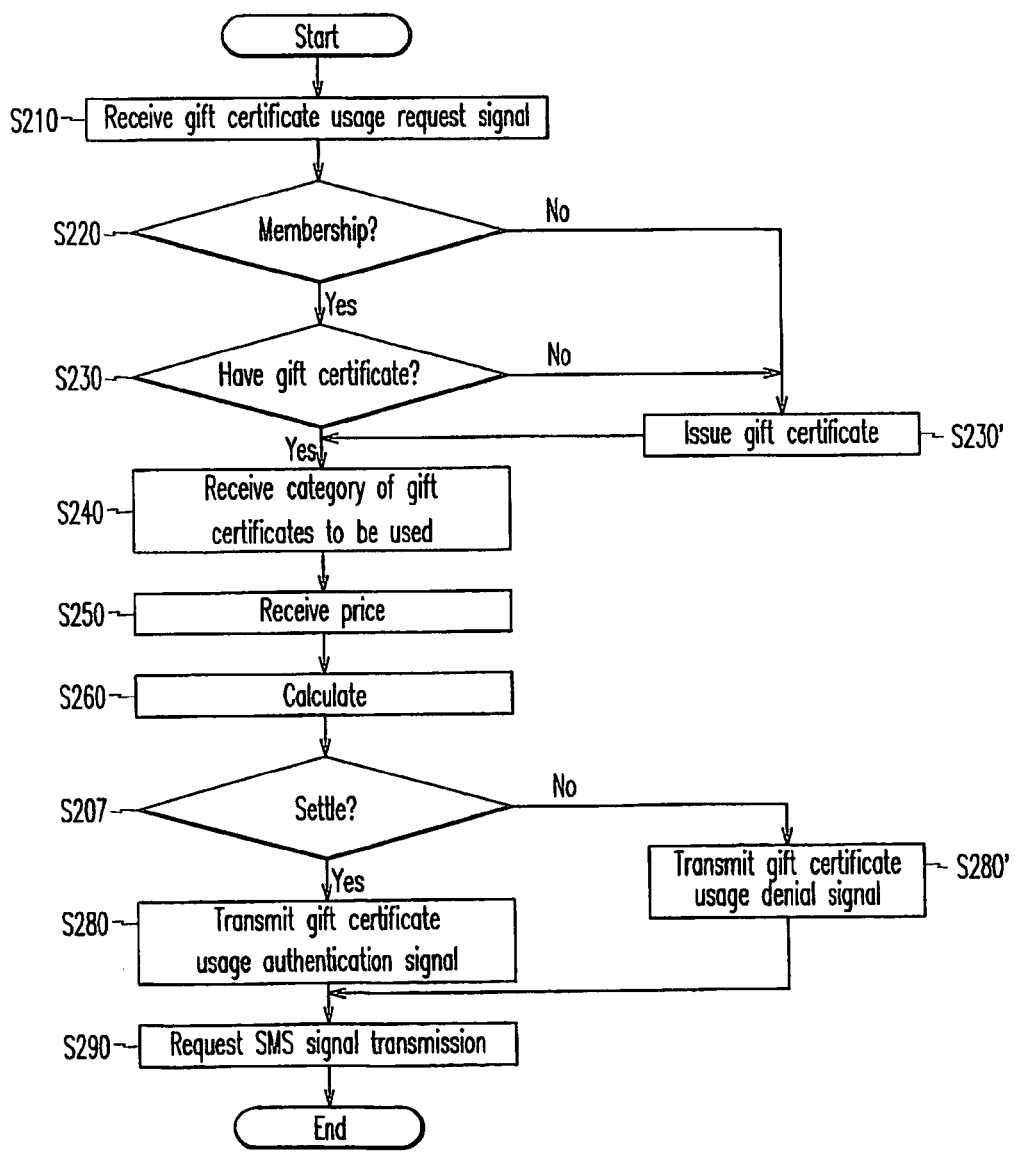
FIG. 4 shows a flowchart for using electronic gift certificates according to a third preferred embodiment of the present invention.

Referring to FIGS. 2 through 4, a management method of the lo above-configured electronic gift certificate circulation system will now be described assuming that the user is registered as a gift certificate member for purchasing, gifting, and using the electronic gift certificate, which is only a preferred embodiment, and a case of requiring no additional membership for usage of electronic gift certificates is also possible and obvious to a skilled person. That is, no additional authentication process is needed since an authentication process is performed at the time of using a mobile terminal when purchasing, gifting, and using the electronic gift certificate. A subsequent process on purchasing, gifting, and using the electronic gift certificate can be easily executed by authentication information of the mobile terminal.

FIG. 2 shows a flowchart for selling electronic gift certificates according to a first preferred embodiment of the present invention, thereby describing a case wherein a user buys an electronic gift certificate using the electronic gift certificate circulation system.

The gift certificate service server 220 receives a gift certificate purchase request signal from a user through a mobile terminal or a computer in step S10.

When the user selects a category, a price, and a number of the gift certificates, and clicks a button, the gift certificate service server 220 receives the corresponding contents in step S20, and receives a settlement request signal in step S30.

According to the settlement request, the gift certificate service server 220 transmits a signal inquiring of a user code of a purchase request signal of the gift certificate database 230 in step S40 so as to check whether the user is available to use the service, and receives a corresponding reply signal in step S50.

The gift certificate service server 220 determines a membership status in step S60, and asks the user whether they would like to join as a member in step S60' when the user is not a member. If the user refuses membership registration, it goes to the step S10, and becomes a standby state for standing by a gift certificate purchase request signal.

When the user desires to be a member and processes a membership process in step S60", or the user is already a member, the user selects a desired one of an internal settlement processed by the gift certificate circulation system and an external settlement through an external agency according to a settlement method in step S70. The internal settlement refers to a method for adding a settlement price to a mobile communication fee, and the external settlement refers to a method for settling the settlement price by using a credit card or a bank account deposit.

When the user selects the internal settlement, the internal settlement is processed through the settlement manager 221 of the gift certificate service server 220 in step S80, and when the user selects the external settlement, the same is processed by inquiring the settlement of an external agency through the VAN 260 or the KFTC 290 in step S80'.

The above-noted processing contents are notified to the user through displaying the contents to the terminal when the user buys the gift certificate through a communication terminal, and through an SMS (short message service) or an MMS (multimedia service) when the user uses the Internet.

Through the above-described process, the user is assigned an electronic gift certificate and allowed to gift or use it.

FIG. 3 shows a flowchart for gifting an electronic gift certificate according to a second preferred embodiment of the present invention, describing a case wherein the user gifts the electronic gift certificate using the electronic gift certificate circulation system.

The gift certificate service server 220 receives a gift certificate gifting request signal from a user through a mobile terminal or a computer in step S110.

The gift certificate service server 220 determines a membership status by using a user code of the gift certificate gifting request signal in step S120, and determines whether the user possesses a gift certificate in step S130 when the user is a member, and performs a member registration process and a gift certificate purchase process in step S130' when the user is not a member.

When the user possessing the gift certificate selects a category and a number of the gift certificate sheets, the gift certificate service server 220 receives the selection information in step S140, and receives data that indicate a transferee such as the transferee's phone number, and a message to be delivered in step S150.

The gift certificate service server 220 allows the user to select a gift certificate and a gift to be sent, receives the selected items, and generates a list for transmitting the items together with the gift certificate in step S160. The gift includes bell sound, background music, a theme card, a character, and a song.

The gift certificate service server 220 transmits the list including the gift certificate to the user so that the user may check gift particulars in step S170, and transmits the gift certificate and the gift to the transferee according to the user's checking reply in step S180.

The gift certificate service server 220 notifies the user of the above-noted processing data through a display of a communication terminal when the user buys the gift certificate through the communication terminal, and requests transmission of the processing data through the SMS or the MMS when the user uses the Internet. If the transferee rejects receipt of the gift, the gift certificate service server 220 notifies the user of the rejection.

FIG. 4 shows a flowchart for using an electronic gift certificate using the electronic gift certificate circulation system according to a third preferred embodiment of the present invention.

The gift certificate service server 220 receives a gift certificate usage request signal through a chain store in step S210.

The gift certificate service server 220 determines a membership status using a user code of the gift certificate usage request signal in step S220, determines whether the user possesses a gift certificate in step S230 when the user is a member, and performs a membership registration process and a gift certificate purchase process in step S230' when the user is not a member.

When the user possessing the gift certificate selects a category and a number of gift certificate sheets, the gift certificate service server 220 receives the selection information in step S240, and receives the price of the product that the user desires to buy in step S250.

The gift certificate service server 220 settles the user's gift certificate in step S260, and determines whether the user is able to use the gift certificate for the current price in step S270, and transmits a usage authentication signal for allowing the user to use the gift certificate in step S280 when a corresponding settlement is possible, and transmits a usage denial signal in other case in step S280'.

The gift certificate service server 220 notifies the user of the above-noted processing data through a display of a communication terminal when the user buys the gift certificate through the communication terminal, and requests transmission of the processing data through the SMS or the MMS when the user uses the Internet.

Methods for using the electronic gift certificates are performed by barcodes displayed on the communication terminals, and a smart card installed therein.

Figure 10:
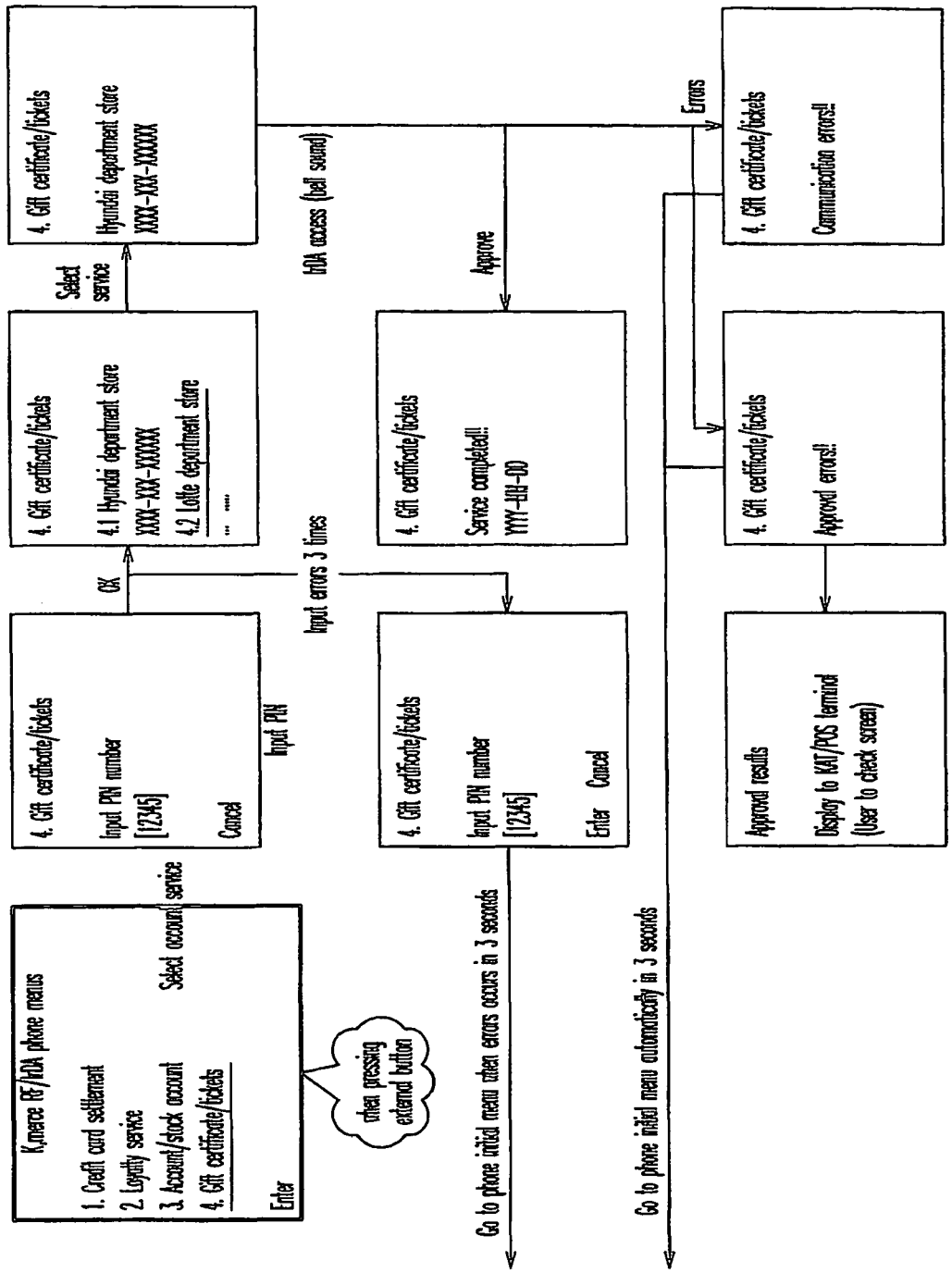
FIG. 10 shows a process for using a gift certificate using a communication terminal as a mobile user interface according to a preferred embodiment of the present invention.

In particular, a K-merce phone having a smart card installed therein has a credit card function to thus request a settlement process from a credit card service provider, and since the settlement is accordingly executed by an external agency, approval of the gift certificate can be rejected by communicational errors as shown in FIG. 10.

In addition, the electronic gift certificates can be settled by using a member authentication membership card or a brand card of a communication service provider or a distribution company without using a communication terminal. This settlement method connects a card terminal of a chain store with an electronic gift certificate circulation system to combine a conventional card terminal with a membership card or a brand card and perform a settlement process, thereby allowing usage of the electronic gift certificates.

Also, a user can buy a desired product at an online shopping mall through a terminal such as a subscriber's computer accessed through the wired network 270 connected to the WEB server 240, and perform an online settlement with the user's electronic gift certificate. Here, the electronic gift certificate circulation system can authenticate the user by using a telephone number of the subscriber's communication terminal and an electronic gift certificate password through the online shopping mall, and then settle the corresponding electronic gift certificate.

Referring to FIGS. 5 through 10, a process for buying, gifting, and using an electronic gift certificate through a communication terminal will now be described in detail.

Figure 5:
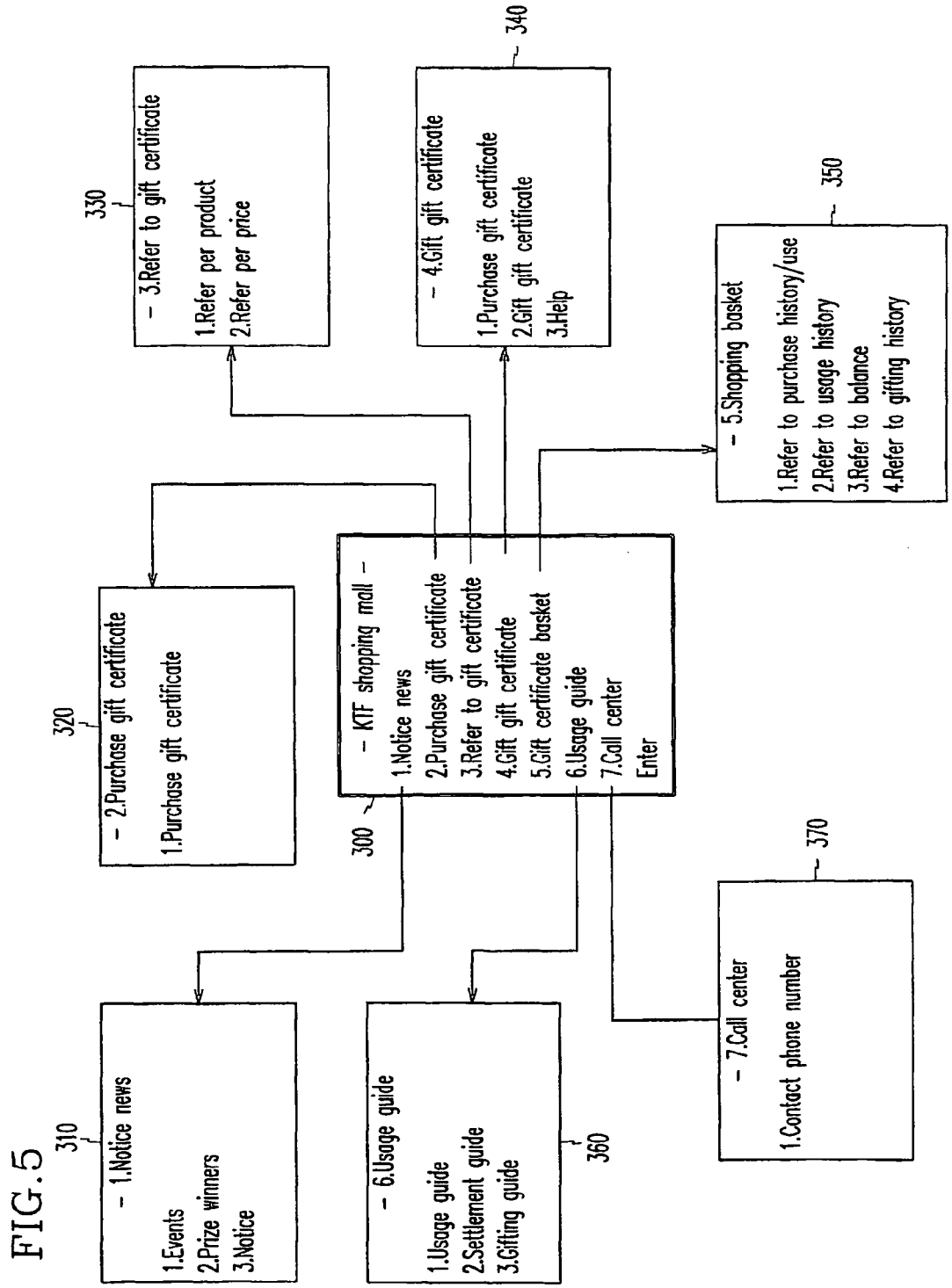
FIG. 5 shows service patterns of a product mall displayed on the communication terminal, that is, a mobile user interface according to a preferred embodiment of the present invention.

FIG. 5 shows service patterns of a product mall displayed on the communication terminal, that is, a mobile user interface according to a preferred embodiment of the present invention.

The reference numeral 300 shows modes for selecting purchase, gifting, and usage of an electronic gift certificate displayed on a communication terminal; a notice; a reference to gift certificates; a gift certificate basket; and a call center. The client can select of them to perform a desired function.

The reference numeral 310 shows a notice for displaying events, prize winners, and notice news, thereby displaying information on electronic gift certificates.

The reference numeral 320 shows purchase of gift certificates, selected by a client when the client desires to buy an electronic gift certificate. By selecting this function, the client buys an electronic gift certificate through a communication terminal, possesses, gifts, and uses the same.

The reference numeral 330 shows reference to gift certificates. The client selects the reference function so as to previously gain information on the gift certificates before buying them. The reference function exemplarily includes references per product and price.

The reference numeral 340 shows the gifting function of gift certificates, which the client selects when buying an electronic gift certificate and gifting it to another person. The gifting process can be combined with a bell sound and a card.

The reference numeral 350 shows a shopping basket selected when the client desires to know information on the gift certificates including a purchase history, a usage history, a balance, and a gifting history. By this function, the client fully checks information on the client's electronic gift certificates.

The reference numeral 360 shows a usage guide to gift certificates, which the client selects when needing details on purchase, gifting, and usage of the electronic gift certificate.

The reference numeral 370 shows a call center which the client selects when desiring to inquire of a system administrator if a problem occurs that cannot be solved through the usage guide of the gift certificates.

By appropriately selecting the above-noted modes of the communication terminal, the client easily buys, gifts, and uses the electronic gift certificate. Further, the client can buy, gift, and use the electronic gift certificate through a computer, and also use the electronic gift certificate which the client bought at an offline chain store.

Figure 6:
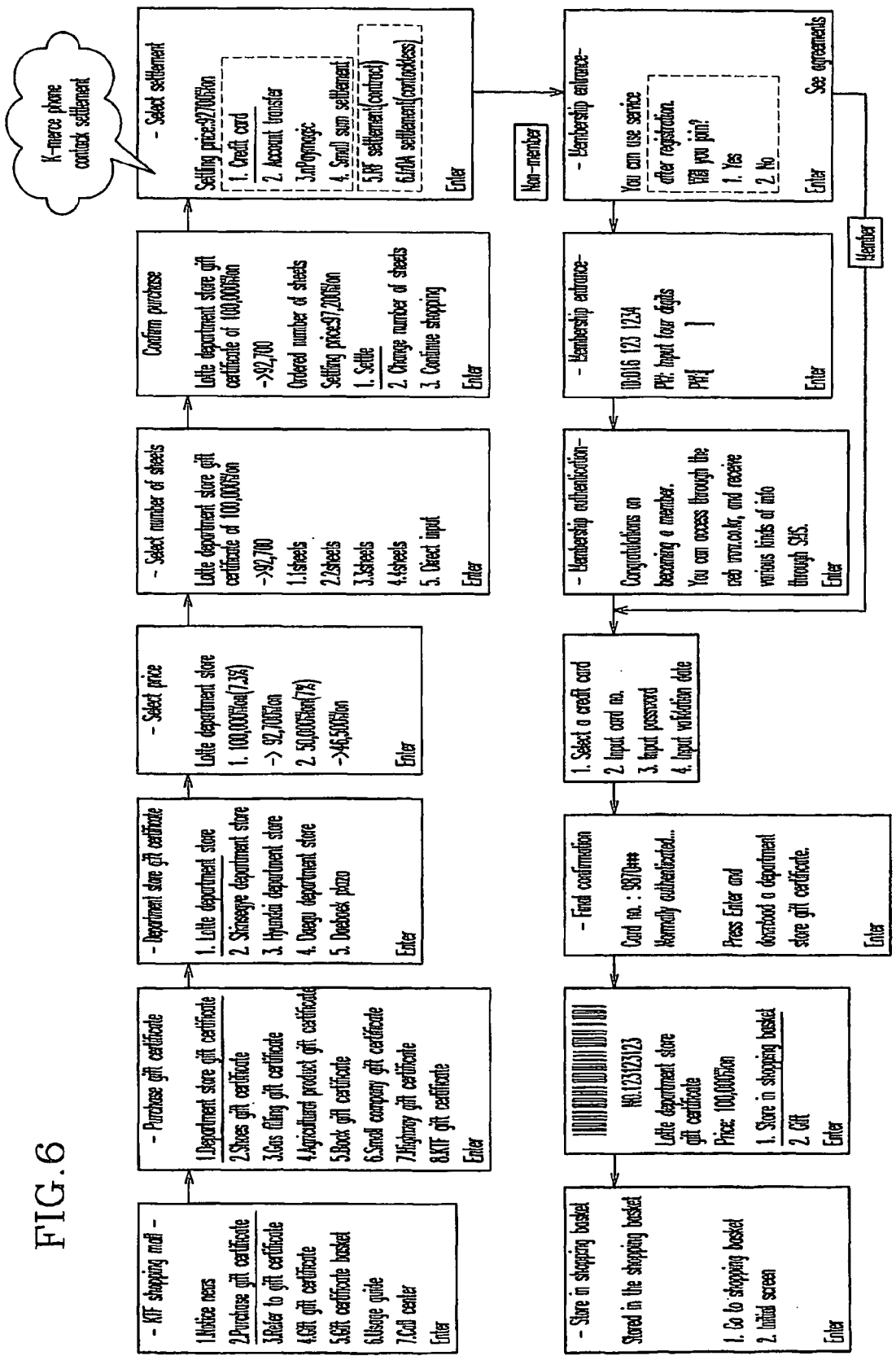
FIG. 6 shows a process for buying a gift certificate using a communication terminal as a mobile user interface according to a preferred embodiment of the present invention.

FIG. 6 shows a process for buying a gift certificate using a communication terminal as a mobile user interface according to a preferred embodiment of the present invention, describing in detail a selling process of FIG. 2 in the viewpoint of a communication terminal, that is, a user, the selling process being performed when the client selects a gift certificate purchase at the product mall of FIG. 5. By progressively clicking the buttons, the user selects a department store gift certificate item, selects a Lotte Department Store item, and selects a price and a number of sheets to enter a settlement process.

The settlement is performed by a credit card, an account transfer, or a mobile phone fee after the client is registered as a member. When the client is already a member or has entered a membership, the client performs the settlement process, and receives a desired gift certificate through a download process. As another embodiment, the client can receive the above-described service if he is a member of a mobile communication service provider irrespective of gift certificate membership status.

In addition, one of the gift certificates is a KTF gift certificate, that is, a mobile communication service provider's gift certificate which is issued by the mobile communication service provider itself. When using it, the client can buy the gift certificate without going through an additional external agency such as a department store gift certificate issuance agency, differing from other gift certificates, thereby maximizing the merits of the preferred embodiments. Since the mobile communication service provider's gift certificates are general-use gift certificates that can be used at any shop cooperating with the mobile communication service provider through a chain store contract, such as department stores, gas stations, and restaurants, their efficiency is greater.

Figure 7:
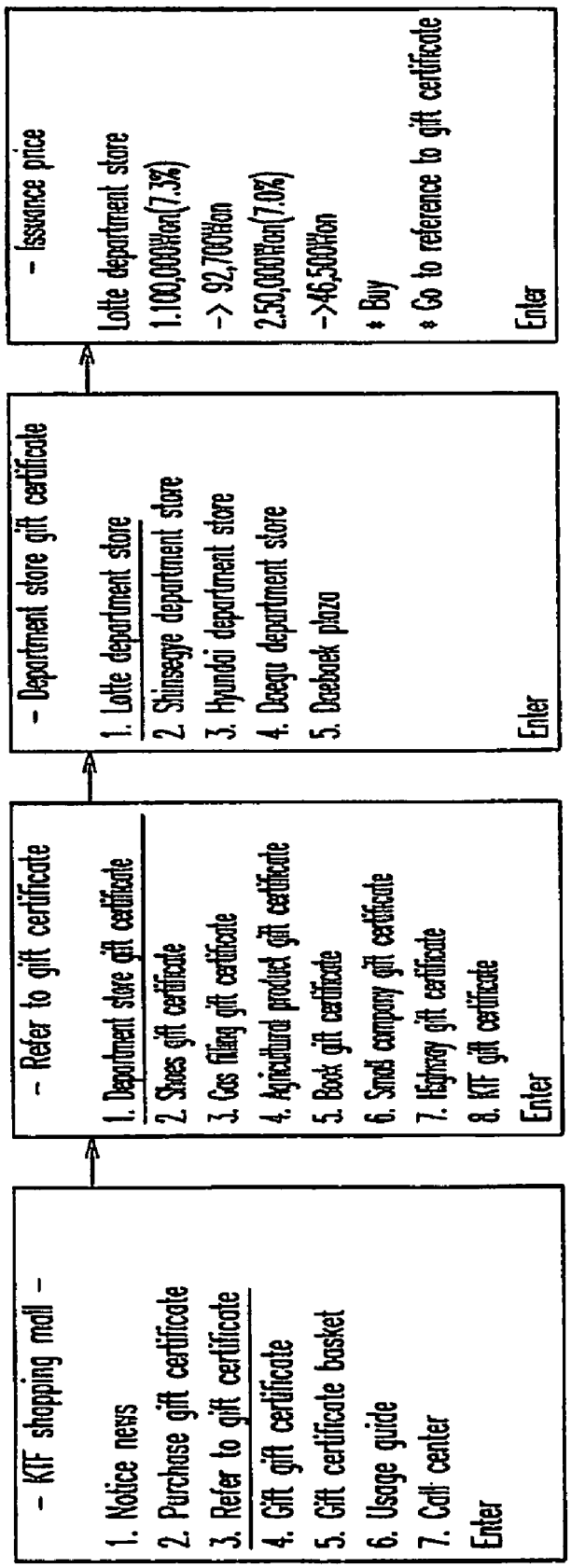
FIG. 7 shows a process for referring to a gift certificate using a communication terminal as a mobile user interface according to a preferred embodiment of the present invention.

FIG. 7 shows a process for referring to a gift certificate using a communication terminal as a mobile user interface when the client selects the gift certificate reference function at the product mall of FIG. 5, according to a preferred embodiment of the present invention. As the client clicks each item, the client selects a department store gift certificate item, selects a Lotte Department Store item, and checks the price and number of sheets possessed by the client.

Figure 8:
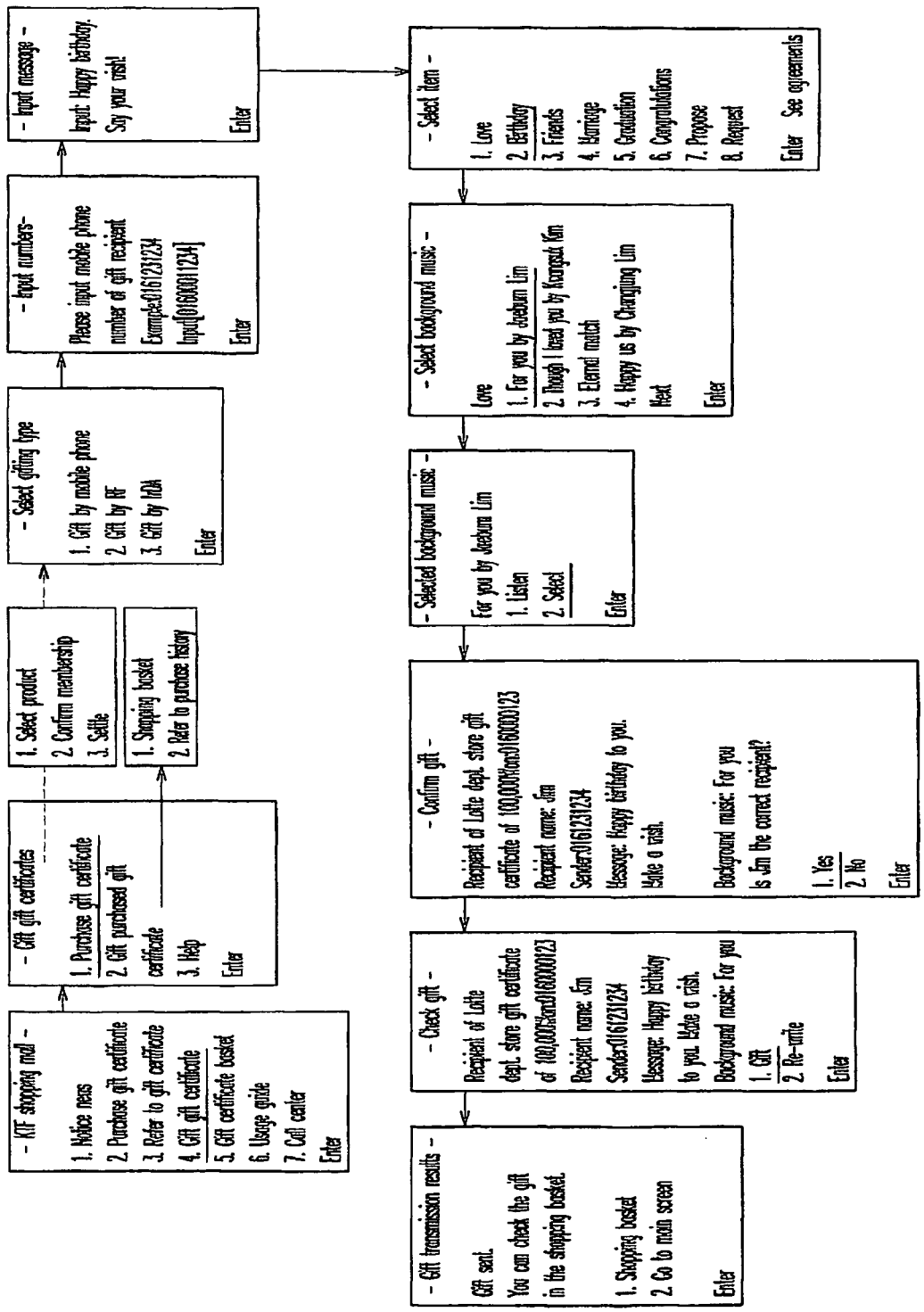
FIG. 8 shows a process for gifting a gift certificate using a communication terminal as a mobile user interface according to a preferred embodiment of the present invention.

FIG. 8 shows a process for gifting a gift certificate using a communication terminal as a mobile user interface when the client selects a gift certificate gifting function at the product mall of FIG. 5, according to a preferred embodiment of the present invention. Gifting of the gift certificates can be performed through a mobile phone's general mode, that is, a mobile communication service provider's service, the K-merce phone's RF terminal, or an IrDA terminal.

An appropriate screen mode is displayed on the communication terminal according to a selection of the gifting method, and a user inputs a telephone number of the transferee and a message, and if the user desires to transmit a gift such as a bell sound, background music, and a card, together with the message, the user selects one of them to have it be configured into a single gift combined with the gift certificate. When the user checks the packaged gift and clicks the check button, the corresponding gift is transmitted to a corresponding person, and the confirmation message is displayed through the communication terminal.

Figure 9:
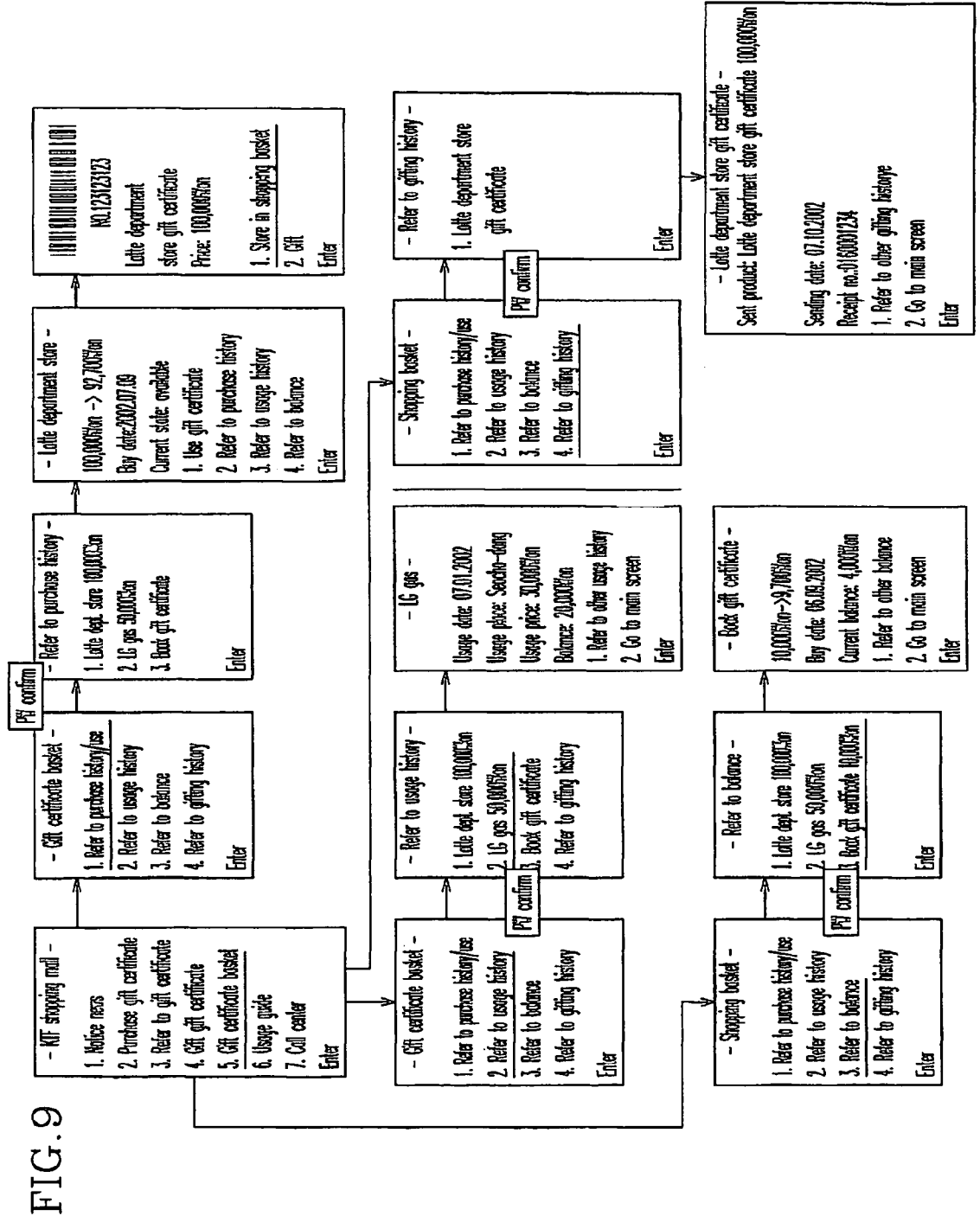
FIG. 9 shows a process for checking a shopping basket using a communication terminal as a mobile user interface according to a preferred embodiment of the present invention.

FIG. 9 shows a process for checking a shopping basket of a product mall of FIG. 5 using a communication terminal as a mobile user interface when the user selects the shopping basket according to a preferred embodiment of the present invention, the process including references to purchase history, usage history, a balance, and a gifting history.

The reference to the purchase history allows the user to check a list of the gift certificates and use a desired gift certificate. The user uses the gift certificate by showing a barcode gift certificate to an offline chain store when the barcode gift certificate is displayed to the communication terminal through checking the gift certificate. Also, the user uses the gift certificate on line at an online shopping mall of the WEB server on the wired Internet or of the ME server on the wireless Internet.

The reference to the purchase history displays a history of the user's having used the gift certificates, the reference to the balance displays the balances left per gift certificate, and the reference to the gifting history displays information on the gift certificates that the user has gifted.

FIG. 10 shows a process for using a gift certificate using a communication terminal as a mobile user interface according to a preferred embodiment of the present invention, describing a case of using a K-merce phone to use an electronic gift certificate at an offline chain store, differing from FIGS. 5 through 9. Here, the user presses an additional external button to display a screen shown in the drawing, and presses a gift certificate/ticket button to start a gift certificate usage process.

The user inputs a PIN number for proving the right to use the gift certificate, selects a category of the gift certificate, and accesses the IrDA terminal to receive an approval, and hence, corresponding processing results are displayed to a POS terminal, and the user uses the gift certificate.

In this process, the usage of the gift certificate can be rejected because of PIN number inputting errors, communicational errors, and approval errors. When the errors have occurred, the current menu automatically goes to the initial menu of the communication terminal.

In the above, the processes generated when the user buys, gifts, to and uses gift certificates are described with respect to communication between a communication terminal and a gift certificate service system. That is, when a user transmits a gift certificate usage signal to the gift certificate service system through a communication terminal, the gift certificate service system transmits corresponding information to the communication terminal, and the user selects specific functions, and these processes are repeated until a predetermined task is finished, and they are not restricted to the above embodiment and can be modified as below.

The modified method is to store the menus of FIGS. 5 through 10 in the communication terminal, and accordingly, the items that are processed without cooperation with the gift certificate service server are processed by the terminal, and the processing results are stored in the terminal and concurrently transmitted to the gift certificate service system and stored in the gift certificate database. This method is more effective for slow transmission rate cases although it requires further storage capacity. In this instance, a device for controlling the items processed by the terminal is needed, and since the device is known to a skilled person, no corresponding description will be provided.

As described, since the electronic gift certificate management system and a mobile communication system are integrated into a single body, and corresponding tasks are processed, the electronic gift certificate circulation system is simplified, and quick and accurate purchase, gifting, and usage of electronic gift certificates are allowable.

Further, since the electronic gift certificate management system and a mobile communication system are integrated into a single body, and corresponding tasks are processed, no additional settlement processes are necessary when using electronic gift certificates through a communication terminal, and the user can directly buy, gift, and use the electronic gift certificates.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A gift certificate service system for managing sales, gifting, and usage of electronic gift certificates according to a request by a user's communication terminal through a wired network, wireless network, or both, comprising:

a gift certificate service server for managing purchase, gifting, and usage operations on the electronic gift certificates from the communication terminal;

a gift certificate database, accessed by the gift certificate service server, for storing electronic gift certificate information prior to transferring the gift certificate to a transferee, and processing a reply to an inquiry of electronic gift certificate usage from the gift certificate service server; and a network server, accessed by the gift certificate service server and accessed by the user's communication terminal through the wired network, wireless network, or both, for performing a client interface function with the purchase, gifting, and usage of the electronic gift certificates, and transmitting the user's gift certificate purchase particulars and gift certificate information for usage of the corresponding gift certificate to the communication terminal, wherein the electronic gift certificate is a multimedia message including barcode data, wherein the network server is responsive to use of the electronic gift certificate occasioned by displaying the barcode data on the communication terminal, and wherein the electronic gift certificate information stored by the gift certificate database includes at least one of a gifting history of the gift certificates or a usage history of the gift certificates.

2. The system of claim 1, wherein the gift certificate service server comprises:

means for receiving a user's purchase request from the communication terminal;

means for checking a settlement state of the electronic gift certificate bought by the user, means for settling the electronic gift certificate bought by the user, and issuing the bought electronic gift certificate to the user, when the user requests settlement;

means for storing the issued gift certificate information in the gift certificate database; and means for notifying the user of the gift certificate purchase particulars in a message format.

3. The system of claim 1, wherein the gift certificate service server comprises:

means for receiving a user's gifting request from the communication terminal;

means for inquiring an existence state of the gift certificate possessed by the user of the gift certificate database, and determining the existence state;

means for receiving information on the gift certificate to be gifted and a transferee when the user's gift certificate is found;

means for transmitting the gift certificate selected by the user to the transferee;

means for updating the users gift certificate information, storing the updated information in the gift certificate database together with the transferee's gift certificate information; and means for notifying the user of the gift certificate gifting information in a message format.

4. The system of claim 1, comprising:

means for receiving a user's usage request from the communication terminal;

means for inquiring the gift certificate database of an existence state of the gift certificate possessed by the user, and determining the existence state;

means for settling the price with the gift certificate and determining whether the settlement is possible;

means for allowing processing of the settlement on the price information when the settlement is possible based on the usage of the gift certificate;

means for settling the user's gift certificate information, updating the settlement information, and storing the updated information in the gift certificate database; and means for notifying the user of the gift certificate usage information in a message format.

5. The system of claim 1, wherein the history of the gift certificates is classified by types, users, and prices of the gift certificates.

6. An electronic gift certificate circulating method for a gift certificate service system including a gift certificate database and a gift certificate service server to manage sales of the electronic gift certificates according to requests by a communication terminal through wired networks, wireless networks, or both, comprising:

(a) receiving a user's purchase request from the communication terminal which displays barcode data upon use of the electronic gift certificate;

(b) checking a settlement state of the electronic gift certificate, wherein checking a settlement state of the electronic gift certificate comprises checking a settlement state of a multimedia message including barcode data;

(c) settling the electronic gift certificate, and issuing the electronic gift certificate to the user, when the user requests settlement;

(d) storing the issued gift certificate information in the gift certificate database prior to transferring the gift certificate to a transferee, wherein storing the issued gift certificate information comprises storing electronic gift certificate information including at least one of a gifting history of the gift certificates or a usage history of the gift certificates; and (e) notifying the user of the gift certificate purchase particulars and gift certificate information for usage of the corresponding gift certificate in a message format.

7. The method of claim 6, further comprising: checking the user's membership authentication state.

8. The method of claim 6, wherein in (a), the purchase request includes information on a category of the gift certificates desired by the user, a price, and a number of gift certificates.

9. The method of claim 6, wherein in (c), the settlement price of the bought electronic gift certificate is summed with the users communication terminal usage fee, and the summed price and fee are then settled.

10. The method of claim 6, wherein in (e), the message format includes a SMS (short message service) format or a MMS (multimedia message service) format.

11. The method of claim 6, wherein receiving a user's purchase request from the communication terminal comprises receiving a request of a reference to a gift certificate and providing information about the gift certificate.

12. An electronic gift certificate circulating method for a gift certificate service system including a gift certificate database and a gift certificate service server to manage gifting of the electronic gift certificates according to requests by a communication terminal through wired networks, wireless networks, or both, comprising:

(a) receiving a user's gifting request from the communication terminal which displays barcode data upon use of the electronic gift certificate;

(b) inquiring within the gift certificate database of an existence state of the gift certificate possessed by the user, and determining the existence state, wherein inquiring within the gift certificate database of an existence state of the gift certificate comprises inquiring of an existence state of a multimedia message including barcode data, and inquiring of electronic gift certificate information including at least one of a gifting history of the gift certificates or a usage history of the gift certificates;

(c) receiving information on the gift certificate to be gifted and a transferee when the user's gift certificate is found;

(d) transmitting the gift certificate selected by the user to the transferee based upon the determined existence of the gift certificate;

(e) updating the user's gift certificate information, storing the updated information in the gift certificate database together with the transferee's gift certificate information; and (f) notifying the user of the gift certificate gifting information in a message format.

13. The method of claim 12, further comprising: checking the user's membership authentication state between (a) and (b), and further comprising: performing a gift certificate buying process when the user has no gift certificate in (b).

14. The method of claim 12, further comprising: determining whether an additional gift to be transmitted together with the gift certificate is provided, and receiving corresponding information when the additional gift is found according to the determination, after (c), and transmitting the gift certificate and the additional gift to the transferee in (d).

15. The method of claim 14, wherein the additional gift includes a bell sound, a theme card, background music, and a character.

16. The method of claim 12, wherein in (f), the message format includes a SMS (short message service) format or MMS (multimedia message service) format.

17. An electronic gift certificate circulating method for a gift certificate service system including a gift certificate database and a gift certificate service server to manage usage of the electronic gift certificates according to requests by a communication terminal through wired and wireless networks, comprising:

(a) receiving the user's usage request from the communication terminal;
(b) inquiring the gift certificate database of an existence state of the gift certificate possessed by the user, and determining the existence state prior to transferring the gift certificate to a transferee, wherein determining the existence state comprises determining the existence state of a multimedia message including barcode data, and determining the existence state of electronic gift certificate information including at least one of a gifting history of the gift certificates or a usage history of the gift certificates;
(c) settling the price with the gift certificate and determining whether the settlement is possible, wherein settling the price with the gift certificate and determining whether the settlement is possible comprises presenting the gift certificate by displaying barcode data on the communication terminal;
(d) allowing processing of the settlement on the price information when the settlement is possible based on the usage of the gift certificate;
(e) settling the user's gift certificate information, updating the settlement information, and storing the updated information in the gift certificate database; and
(f) notifying the user of the gift certificate usage information in a message format.

18. The method of claim 17, further comprising; checking the user's membership authentication state between (a) and (b), and further comprising: performing a gift certificate buying process when the user has no gift certificate in (b).

19. The method of claim 17, wherein in (f), the message format includes a SMS (short message service) format or a MMS (multimedia message service) format.

20. The method of claim 17, wherein in (a), the usage request is transmitted from the user's mobile communication terminal.

21. The method of claim 20, wherein the mobile communication terminal has a credit card function therein.

22. The method of claim 17, wherein in (a), the usage request is transmitted from a chain store's card terminal according to a card usage by the user.

23. The method of claim 22, wherein the user's card is a membership card for membership authentication by service providers including a communication service provider and a distribution company.

24. The method of claim 22, wherein the user's card is a brand card.

25. The method of claim 17, wherein in (a), the usage request is transmitted from an online shopping mall, when the user buys a desired product at the online shopping mall and requires an online settlement using the gift certificate, wherein the online shopping mall includes at least one online shop.

26. The method of claim 17, wherein presenting the gift certificate by displaying barcode data on the communication terminal comprises presenting the gift certificate to an offline store by displaying barcode data.

27. The method of claim 17, wherein settling the price with the gift certificate and determining whether the settlement is possible comprises authenticating the user based on at least one of a telephone number associated with the communication terminal or an electronic gift certificate password.

* * * * *

UNITED STATES PATENT AND TRADEMARK OFFICE
CERTIFICATE OF CORRECTION

PATENT NO.      : 7,580,864 B2                                               Page 1 of 1
APPLICATION NO. : 10/528528
DATED           : August 25, 2009
INVENTOR(S)     : Hee-Jung Ahn It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 610 days.

Signed and Sealed this

Fourteenth Day of September, 2010

David J. Kappos
*Director of the United States Patent and Trademark Office*